(No Model.)

F. W. NAGEL.
ROLLER BEARING FOR WAGONS.

No. 499,847. Patented June 20, 1893.

Witnesses
Geo. W. Young
N. E. Oliphant

Inventor
Frederick Wm Nagel
By H. G. Underwood
Attorney

UNITED STATES PATENT OFFICE.

FREDERICK WILLIAM NAGEL, OF WALDO, WISCONSIN.

ROLLER-BEARING FOR WAGONS.

SPECIFICATION forming part of Letters Patent No. 499,847, dated June 20, 1893.

Application filed February 28, 1893. Serial No. 464,082. (No model.)

*To all whom it may concern:*

Be it known that I, FREDERICK WILLIAM NAGEL, a citizen of the United States, and a resident of Waldo, in the county of Sheboygan, and in the State of Wisconsin, have invented certain new and useful Improvements in Roller-Bearings for Wagons; and I do hereby declare that the following is a full, clear, and exact description thereof.

My invention has for its object to provide a means for reducing friction whereby I provide for lighter running of heavy wagons; and said invention consists in certain peculiarities of construction and combination of parts hereinafter described with reference to the accompanying drawings and subsequently claimed.

Figure 1:
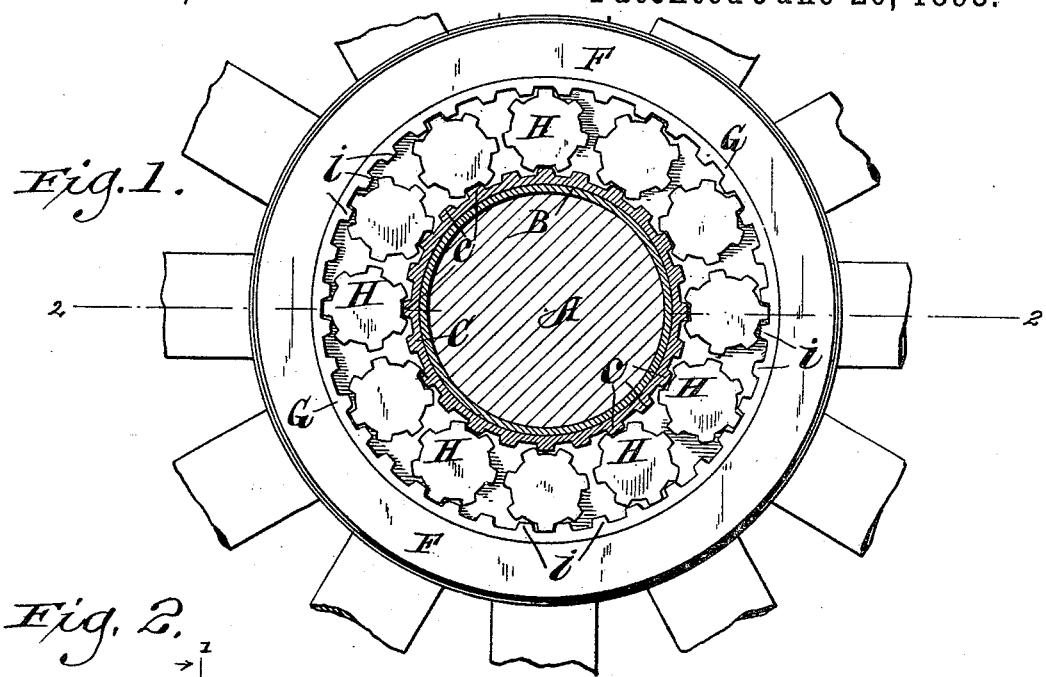
Figure 2:
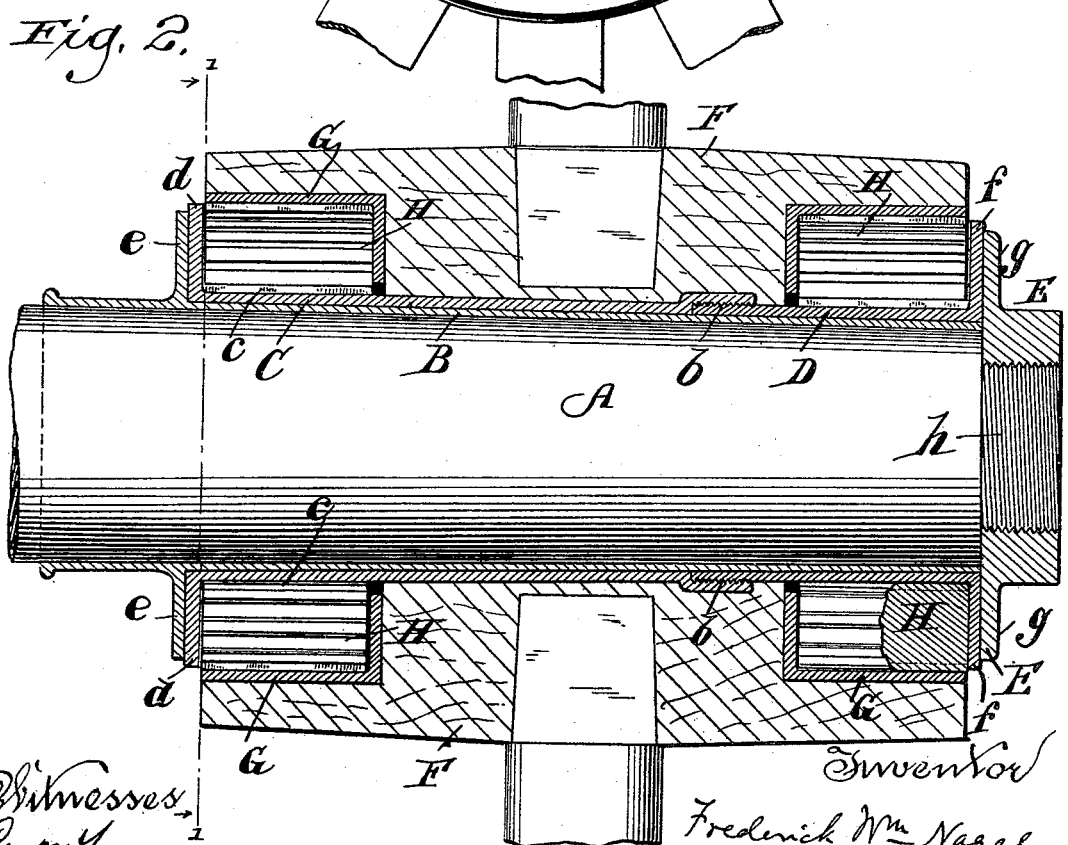

In the drawings: Figure 1 represents a transverse section taken on line 1—1 of the succeeding figure, and illustrates the relative arrangement of the several parts comprehended in my invention; Fig. 2, a horizontal section taken on line 2—2 of the preceding figure.

Referring by letter to the drawings, A represents an ordinary heavy wagon-axle, B a flanged skein for the axle. Surrounding the axle is a metallic box consisting of two sections C, D, having a screw-threaded union $b$, and peripheral teeth $c$, the latter being adjacent to the outer ends of said box-sections. The skein-box is made in sections to make it possible to position certain of the other parts comprehended in my invention.

The outer end of the box-section C is provided with a flange $d$ opposed by another flange $e$ on the skein B, and the flange $f$ on the other box-section D is opposed by a flange $g$ forming part of a nut E that is herein shown as being run on a stud $h$ at the outer end of the axle A hereinbefore set forth, although it is common to have said axle and skein of a length to permit of a thread being cut on the latter to receive a flanged nut.

Loose on the skein-box is a wheel-hub F provided at its ends with suitable recesses in which correspondingly shaped boxes G are rigidly secured, these boxes being interiorly provided with teeth $i$ and engaged by toothed rollers H, that are also in mesh with the toothed portions of said skein-box, the flanges $d$, $f$, at the extremities of the latter box serving to prevent longitudinal displacement of the rollers.

In practice the skein-box remains stationary owing to the clamping action of the skein and axle-nuts against its ends and the load that comes thereon. The hub F being free to turn, the boxes G fast therein and the rollers H will revolve around the stationary skein-box and thereby reduce the friction that is usual in wagons having hub boxes that rotate in contact with the axle.

Having thus described my invention, what I claim as new, and desire to secure by Letters Patent, is—

1. An axle and its skein, in combination with a skein-box having peripheral teeth, a hub loose on the skein-box, interiorly toothed boxes fast in the hub, and toothed rollers maintained in mesh with the toothed portions of said skein and hub-boxes, substantially as set forth.

2. An axle and flanged skein thereon, in combination with a skein-box comprising a pair of peripherally toothed sections flanged at their outer ends and having a screw-threaded engagement one with the other, a hub loose on the skein-box intermediate of the flanges on the same, interiorly toothed boxes fast in the hub, toothed rollers maintained in mesh with the tooth portions of said skein and hub-boxes, and a flanged nut arranged to force the skein-box tight against the skein-flange, substantially as set forth.

In testimony that I claim the foregoing I have hereunto set my hand, at Waldo, in the county of Sheboygan and State of Wisconsin, in the presence of two witnesses.

FREDERICK WILLIAM NAGEL.

Witnesses:
S. E. WIESMAN,
WM. J. BENNINK.